United States Patent [19]
Qatu et al.

[11] Patent Number: 6,155,378
[45] Date of Patent: Dec. 5, 2000

[54] METHOD AND APPARATUS FOR NOISE SUPPRESSION IN A FLUID LINE

[75] Inventors: Mohamad S. Qatu, Bloomfield Hills; Michael L. Dougherty, Sr., Rochester Hills, both of Mich.

[73] Assignee: Dana Corporation, Toledo, Ohio

[21] Appl. No.: 09/346,462

[22] Filed: Jul. 1, 1999

[51] Int. Cl.$^7$ ........................................................ F01N 1/00
[52] U.S. Cl. ........................................... 181/255; 138/113
[58] Field of Search ..................................... 181/226, 233, 181/255; 138/30, 112, 113, 114

[56] References Cited

U.S. PATENT DOCUMENTS

| | | |
|---|---|---|
| 2,238,146 | 4/1941 | Yavitch . |
| 3,165,123 | 1/1965 | Hawkins . |
| 3,323,305 | 6/1967 | Klees . |
| 3,908,788 | 9/1975 | Hammarstedt . |
| 4,243,073 | 1/1981 | Hugley . |
| 4,611,633 | 9/1986 | Buchholz . |
| 4,794,955 | 1/1989 | Ejima et al. . |
| 5,172,729 | 12/1992 | Vantellini . |
| 5,201,343 | 4/1993 | Zimmermann et al. . |
| 5,475,976 | 12/1995 | Phillips . |
| 5,697,216 | 12/1997 | Phillips . |
| 5,941,283 | 8/1999 | Forte ........................................ 181/255 |

FOREIGN PATENT DOCUMENTS

| | | |
|---|---|---|
| 0 426 789 B1 | 5/1991 | European Pat. Off. . |
| 0 471 044 B1 | 2/1992 | European Pat. Off. . |
| 3339876 A1 | 5/1985 | Germany . |
| 2 054 041 | 2/1981 | United Kingdom . |

OTHER PUBLICATIONS

The Use Of Flexible Hose To Reduce Pressure Ripple In Power Steering, submitted by Dr. J. E. Drew for the degree of PhD of the University of Bath in 1997.

*Primary Examiner*—Khanh Dang
*Attorney, Agent, or Firm*—Reising, Ethington, Barnes, Kisselle, Learman & McCulloch, PC

[57] ABSTRACT

Method and apparatus for suppression of fluid-borne noise in hydraulic or fluid handling systems, such as automotive power steering, power brakes, air conditioning and fuel systems wherein a multi-chamber solution to attenuate fluid-borne noise in the system is disclosed. This solution optimizes both damping, interference and wave cancellation mechanisms in a fluid system and consists of dividing an attenuator conduit hose or pipe assembly serially into tuning chambers by a restrictor or other mechanism. In some embodiments, a tuner is placed in each and every chamber. The number of chambers can vary between two and four depending on the objective of the attenuation. In order to attenuate the ripple at the pump, the tuner in the first or most upstream chamber can be removed.

13 Claims, 2 Drawing Sheets

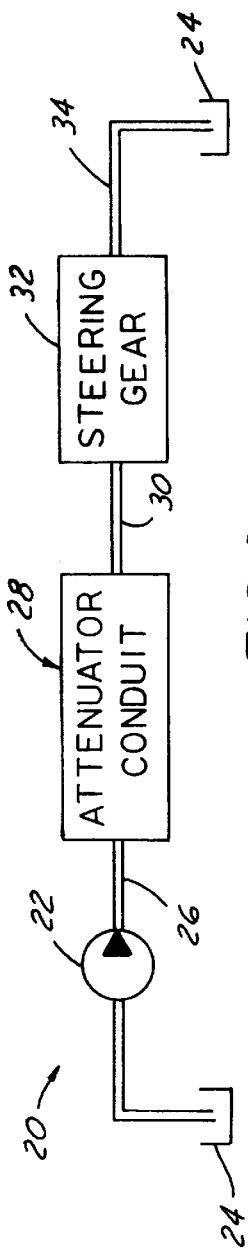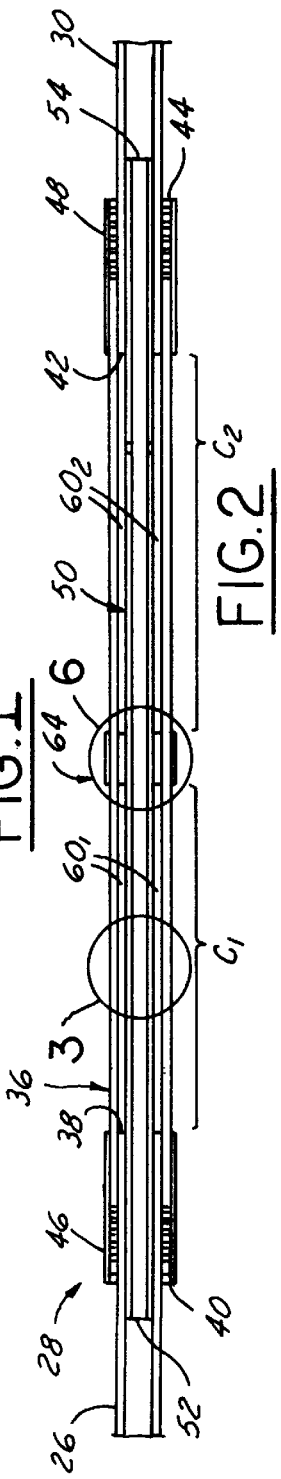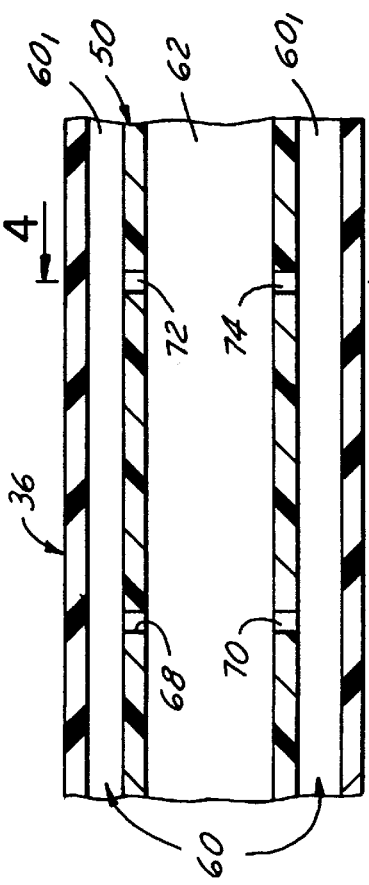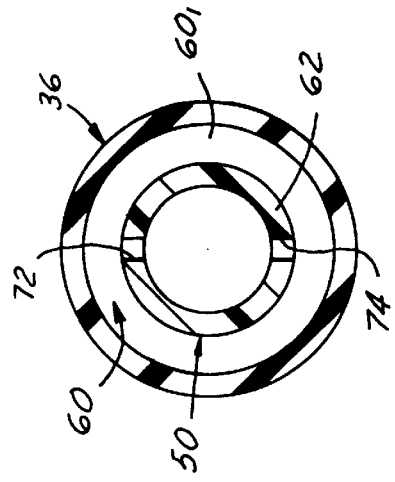

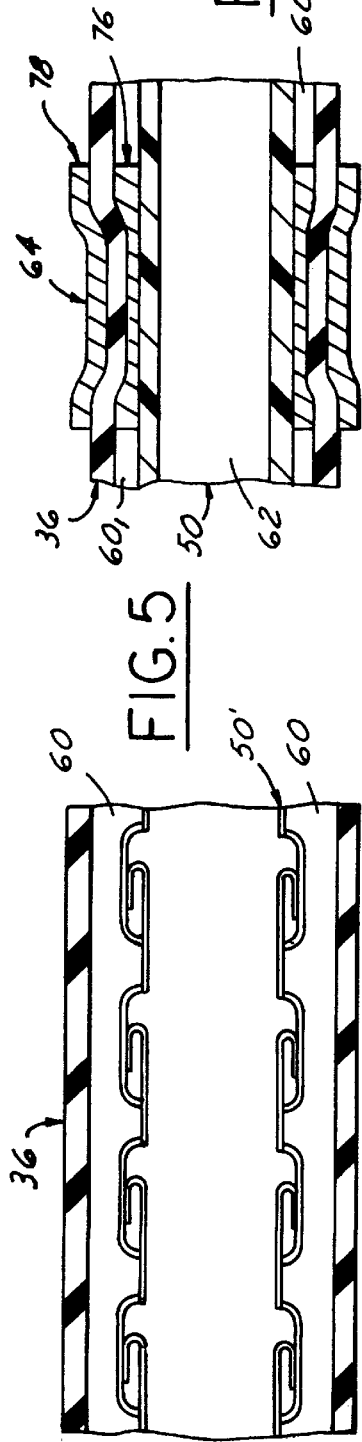
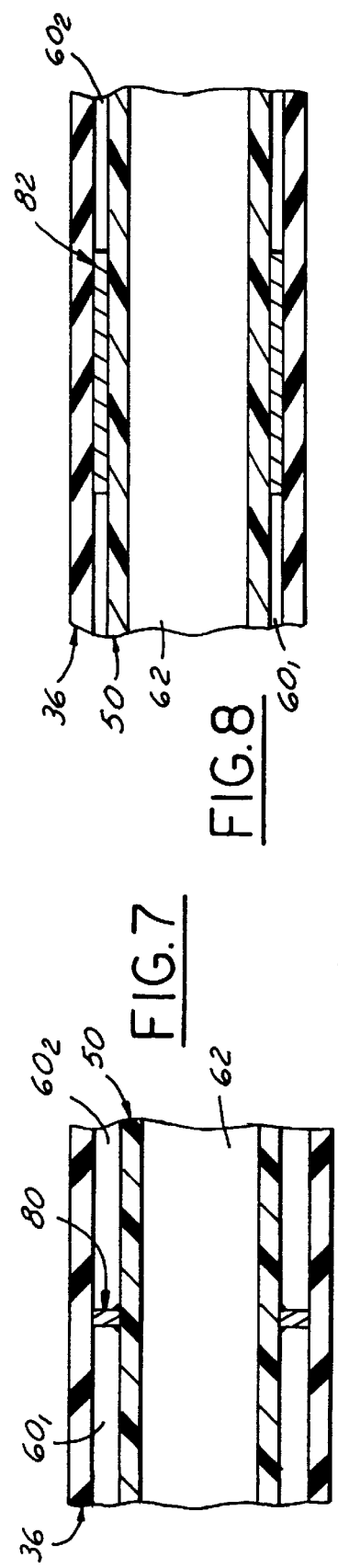
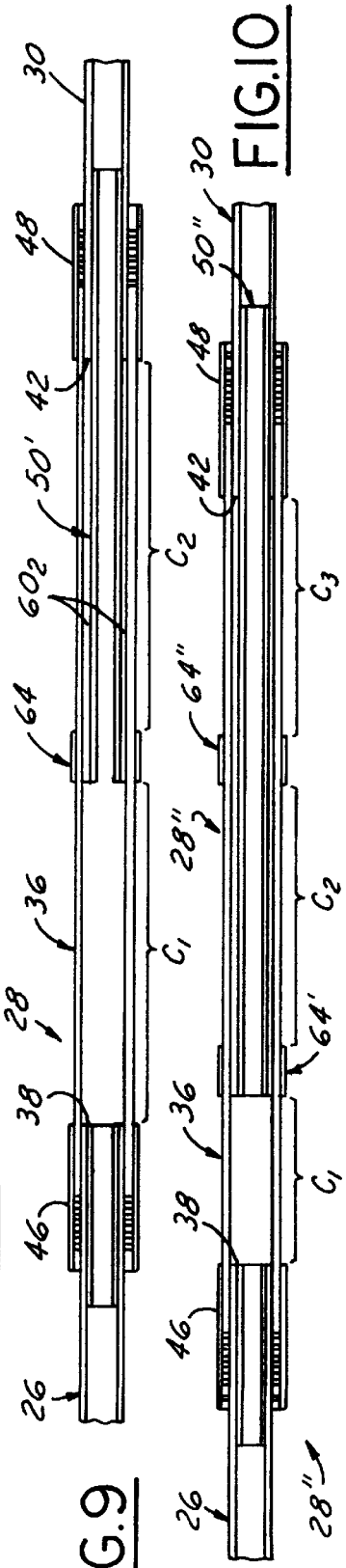

METHOD AND APPARATUS FOR NOISE SUPPRESSION IN A FLUID LINE

FIELD OF THE INVENTION

The present invention relates to suppression of fluid-borne noise in hydraulic or fluid handling systems, such as automotive power steering, power brake, air conditioning and fuel distribution systems.

BACKGROUND OF THE INVENTION

There are many applications in industry and commerce where it is desirable, and in some cases required, to suppress fluid-borne noise in hydraulic power systems and other fluid handling systems. As an example, it is desirable to attenuate or suppress fluid-borne noise generated by the pump or fluid valving in power steering, power brake, fuel distribution and air conditioning systems. It is also desirable to suppress compressor noise in domestic and commercial air conditioning systems. Fluid-borne noise can also be a problem in various industrial hydraulic systems where the fluid pressure pulses generate an audible and objectionable noise causing both wear and fatigue of system components, and which can also exceed OSHA requirements.

The inherent design of fluid pumps, whether driven by an internal combustion engine, an electric motor or by fluid system valves, causes pressure fluctuations or pulses in the fluid line which generate fluid-borne noise. The pistons, gerotors, gears, vanes or other fluid displacement elements that pump the fluid cause pressure fluctuations, ripple, or pulses within the fluid at a frequency that is dependent upon pump speed. The geometry and inherent characteristic of the pump can also be sources of fluid pressure fluctuations and vibrations. This fluid ripple can be a source of audible and objectionable noise and can also excite components along its path (e.g., the steering gear in power steering) to cause them to become secondary generators of such noise.

During normal operation of an automotive power steering system, for example, hydraulic fluid pressure can repetitively vary and thereby generate a pressure dependent wave form that can range substantially in magnitude or amplitude between the upper and lower limit values and induce system vibration. The frequency of such fluid-borne vibration also can vary substantially with the speed of the driving component (e.g., engine) and other factors. It has been proposed to use expansible-type hoses as the fluid conductors in fluid systems in order to dampen and absorb such fluid-borne vibrations. These hoses typically consist of a tube of rubber or another elastomeric material which is reinforced by braiding that consists of nylon or a similar material. The braiding may be disposed within the outer circumference of the tubing, or may be disposed within a layer of elastomeric material that is itself disposed around the outside of the tubing. The soft, compressible, elastic material of expansible hose expands upon pressure to absorb pressure fluctuations in the fluid. The strengthening braid also allows some degree of expansion when subjected to pressure.

Expansible hoses are wide-band devices and, in principle, can respond to fluid vibrations over a wide frequency range. For satisfactory performance, there must be enough expansion capability in the elastomeric hose material to absorb the pressure fluctuations over the amplitude and frequency range encountered in the fluid system. However, this is possible only when the changes in volume flow rate associated with the pressure ripples are less than the volume expansion capability of the hose for the same change in hydraulic fluid pressure.

Accordingly, to dampen the fluctuation even further, an attenuator in the form of a tuner conduit made of spirally constructed steel or nylon has been used within the hose. This tuner usually permits the fluid to flow from within its bore into the annulus or chamber formed between the tuner O.D. and the hose I.D. or bore. The fluid flowing in this annulus meets the fluid which is flowing inside the tuner bore at the downstream end of the tuner length.

Some examples of prior art method and apparatus for reduction of fluid-borne noise in hydraulic systems by utilizing various forms of expansion hoses are disclosed in U.S. patents to Klees U.S. Pat. No. 3,323,305; Hammarstedt U.S. Pat. No. 3,908,788; Buchholz et al U.S. Pat. No. 4,611,633; Ejima et al U.S. Pat. No. 4,794,955; Vantellini U.S. Pat. No. 5,172,729; Zimmermann et al U.S. Pat. No. 5,201,343; Phillips U.S. Pat. No. 5,475,976 and Phillips U.S. Pat. No. 5,697,216 (all of which are incorporated herein by reference), as well as in several of the United States patent documents cited as references in the aforementioned prior art patents.

OBJECTS OF THE INVENTION

Among the objects of the present invention are to provide a system and an improved method of suppressing fluid-borne noise in hydraulic systems, such as automotive power steering, power brake, fuel distribution and air conditioning systems, and improved apparatus for performing such method, that are economical to implement and reliable over an extended operating lifetime, where a hose system configuration can be employed in a variety of applications, and that are passive in operation and that require no input of electrical or any other form of power.

Further objects are to provide an improved system, method and apparatus offering increased flexibility of design, using conventional software that has been developed to simulate hydraulic lines with a traveling wave, and that utilize the phenomena or mechanisms of fluid body and hose line damping together with the phenomena or mechanism of wave cancellation in order to substantially attenuate fluid ripple in the system as well as the wave source (e.g., the pump) for particular frequencies found most objectionable in a given system and application.

SUMMARY OF THE INVENTION

In general, and by way of summary description and not by way of limitation, the foregoing objects are achieved by providing, in accordance with the invention, an improved method and apparatus for performing the method that are designed to develop and optimize solutions based on component lengths to minimize fluid borne noise in hydraulic circuits. The method uses information collected about the source of the ripple and the whole system circuit. Such information may include the impedance of the source and the termination point, if any. This information can be collected experimentally through specialized tests (e.g., impedance and flow ripple tests), or analytically by developing models for ripple sources, such as pumps, and system delivering points, such as power steering gears and similar components.

Several structural implementation methods are disclosed in accordance with the foregoing optimization for dividing the hose or fluid line into chambers:

1. An obstruction device can be a restrictor sleeve adhesively affixed to the tuner or a "dogbone" collar and exterior crimping sleeve (as is the case in current practice). Small tubes of varying diameter can also be sleeved in one another to make this process easier.

2. A small annular small disk can be welded, press fit or attached to the tuner and inserted inside the fluid line. This disk can be made of rubber, metal or plastic. The disk can cover the entire annulus bore area of the fluid line.

3. The restrictor sleeve, collar or disk may also allow a limited flow through the annulus by allowing flow past or through the restrictor into the next chamber to improve leakage.

In one embodiment, the solution comprises an attenuator compliant hose divided into two chambers by means described both hereinabove and hereinafter. A tuner in each chamber is extended to the end of the chamber (or close to that point). This is found to be particularly effective in attenuating downstream system delivering point noise, such as power steering gear ripple. Optimal lengths can be determined by the aforementioned software to attenuate for particular frequencies.

In a modification of the foregoing two-chamber embodiment, the solution consists of an attenuator hose also so divided into two chambers, but a tuner is disposed only in the downstream gear-end chamber and is extended to the end of that chamber (or close to that point). This solution is found to be particularly effective in attenuating the ripple at the ripple source, i.e., the power steering system pump. Optimal lengths can be determined by the foregoing software to attenuate for particular frequencies.

In a second embodiment, the solution comprises an attenuator hose divided into three chambers by means described both hereinabove and hereinbelow. A tuner in each chamber is extended to the end of the chamber (or close to that point). This is found very effective in attenuating delivery point gear ripple. Optimal lengths can be determined by the foregoing software to attenuate for particular frequencies.

In a modification of the foregoing three-chamber embodiment, the solution comprises an attenuator hose also divided into three chambers, but a tuner is disposed only in the second and third downstream or system delivery point end chambers (e.g., "gear-end" chambers), and is extended to the end of each such chamber (or close to that point). However, there is no tuner in the upstream ripple source end (e.g., pump-end) chamber. This solution is found particularly effective in attenuating the ripple at the pump. Optimal lengths can be determined by the foregoing software to attenuate for particular frequencies.

In still another embodiment, the solution comprises a rigid wall attenuator, main conduit, preferably a metallic tube, pipe or casing, that is divided into chambers by means described hereinabove. The attenuator conduit contains a metallic, plastic or polymeric tuner tube having a diameter smaller than that of the main pipe or tube attenuator conduit. This tuner preferably is in the tube form of volumetrically compliant, radially resilient perforate hose. However, the tuner tube alternatively may be radially rigid, so long as its construction retains bending flexibility along its longitudinal axis. In either form, the tuner tube preferably has one or more holes to provide leakage from the main flow area within the tuner bore to the annulus chamber formed between the OD of the tuner and the ID of the surrounding main pipe. Experimental investigation shows that such a main conduit pipe can range in OD size from as little as ½ inch or smaller in outside diameter up to several inches in diameter or larger, depending on the attenuation requirements and packaging constraints. The insert or tuner tube can be as small as few thousands of an inch or several inches in diameter. Again, optimum lengths can be determined to attenuate for particular frequencies.

This rigid wall conduit embodiment, having this mechanism, constructed to provide two chambers, with a tuner in one or each of the chambers, is found to minimize ripple even more than a single chamber. For example, having one tuner in each chamber is found to attenuate the ripple very effectively at the exist of the attenuator main conduit. The separation mechanism between the chambers can be constructed as described earlier. In a modification of the foregoing rigid wall conduit embodiment, removing the tuner from the first chamber or the chamber closer to the ripple source, is found to help attenuate the fluid ripple at the inlet of the attenuator. Optimum lengths of each chamber as well as that of the tuner inside the chambers, if any, can also be determined by the aforementioned software to attenuate for particular frequencies.

BRIEF DESCRIPTION OF THE DRAWINGS

The invention, together with additional objects, features and advantages thereof will be best understood from the following detailed description, appended claims, and the accompanying drawings wherein:

FIG. 1 is a schematic diagram of a fluid handling system equipped with improved pressure ripple attenuator conduit for suppression of fluid-borne noise in accordance with one embodiment of the invention applied to a power steering system;

FIG. 2 shows a two chamber attenuator conduit in the form of a tuned expansion hose embodying certain features of the present invention and shown as a semi-schematic cross sectional view;

FIG. 3 is a fragmentary center sectional view of the portion of FIG. 2 encompassed by the circle labeled 3 in FIG. 2;

FIG. 4 is a cross sectional view taken on the line 4—4 of FIG. 3;

FIG. 5 is a cross sectional view similar to that of FIG. 3 but showing a modified form of tuner tube;

FIG. 6 is a fragmentary cross sectional view of the portion of FIG. 2 encompassed by the circle labeled 6 in FIG. 2;

FIG. 7 is a fragmentary cross sectional view similar to FIG. 6 but showing an alternate restrictor construction;

FIG. 8 is a fragmentary cross sectional view similar to FIGS. 6 and 7 but showing a further modification of a restrictor construction;

FIG. 9 is a semi-schematic cross sectional view of one preferred embodiment of a pressure ripple attenuator conduit of the invention employing a two chamber solution with the tuner removed from the first or upstream chamber; and FIG. 10 is a semi-schematic cross sectional view of a second preferred embodiment of a pressure ripple attenuator conduit of the invention employing a three chamber solution with the tuner removed from the first or upstream chamber;

DETAILED DESCRIPTION OF PREFERRED EMBODIMENTS

FIG. 1 is a schematic diagram illustrating a fluid handling system in the form of a hydraulically actuated power steering system 20 for a vehicle that incorporates an improved first embodiment attenuator conduit 28 of the present invention. Power steering system 20 comprises a pump 22 for applying hydraulic fluid under pressure from a sump 24 through a pipe 26 coupled to the input of attenuator conduit 28, the output of which is coupled by another pipe 30 to a steering gearing load 32, from which the actuating fluid is returned by a pipe 34 to sump 24.

In such a system the pressurized hydraulic fluid output of pump 22 has both a mean pressure value and a pressure variation, pulsation or ripple. This fluid ripple acts as a dynamic force at a hydraulic bend, connection or end point, as does the steering gear in a power steering system. This dynamic force causes vibration of the fluid line itself and/or the structure connected to it. Vibrating surfaces cause audible and objectionable noise and are sources of discomfort in vehicles with hydraulic lines. In order to minimize this noise, the fluid pressure ripple has to be minimized or even eliminated. In current technology and as set forth in the aforementioned prior art patents, elastic (volumetrically compliable) conduit hoses with flexible interior coaxial metal conduit, called a tuning cable or tuner, are being used on a trial and error basis to provide attenuation of the fluid ripple. Tuners are basically flexible conduit inserts that can be used coaxially inside a hose, the hose and tuner conduit defining therebetween an annular fluid chamber that is designed to operate as a quarter-wave side branch portion of a pressure wave interference attenuator.

It is recognized that there are two mechanisms that work to reduce such a ripple. The first is damping. The elastic hose lining and the fluid in the annular chamber (as well as expansion and contraction of the tuner conduit when made as an elastic structure) work conjointly as a damper to reduce the excitation of the ripple. Such damping is a mechanism that works for all frequencies. It is, therefore, referred to as broadband.

The second mechanism is wave cancellation. This is seldom used in a hydraulic system nor investigated thoroughly. In this mechanism, a wave is reflected at the end of the hose or any obstruction along its way. If the obstruction is built at a particular distance (half of the frequency's wavelength) then the total amplitude of the wave in the middle will be approximately zero. This solution works for particular narrow ranges of frequencies and is, therefore, referred to as a narrow-band solution.

In accordance with present invention, a theory has been developed and software has been written to simulate and optimize such systems for minimum pressure ripple. Using the software that has been developed to simulate hydraulic lines with a traveling wave, the current invention(s) optimizes the two mechanisms and presents a solution or a series of solutions that will attenuate the ripple substantially. Furthermore, with certain modifications, the ripple at the wave source (e.g., the pump) can be minimized for particular frequencies.

FIG. 2 illustrates some of the basic constructional features of an attenuator conduit 28 utilized in accordance with the invention. The input and output system lines 26 and 30 communicating with attenuator conduit 28 are typically stainless steel tubing. Attenuator 28 also includes a predetermined length of external expansible hose 36 that is volumetrically compliant, typically a conventional reinforced rubber hose having a predetermined outside diameter, inside diameter and wall thickness that also constitute design parameters in the system, and is a commercially available component. The outlet end 38 of pipe 26 is telescoped with a close fit into the inlet end 40 of hose 36, and likewise the inlet end 42 of pipe 30 is telescoped into the outlet end 44 of hose 36, as indicated in FIG. 2. These telescopic joints are secured by conventional coupling collars 46 and 48 respectively that are each crimp-shrunk about the associated hose ends 40 and 44, such as in the manner described in the aforementioned Klees U.S. Pat. No. 3,323,305, or alternatively as joined in the manner of the various couplings of the other aforementioned prior art patents.

Prior to such crimping of the collars 46 and 48, a tuning cable or tuner 50 is inserted coaxially and concentrically within hose 36 so as to extend at its axially opposite ends 52 and 54 telescopically into the outlet end 38 of inlet pipe 26 and into the inlet end 42 of outlet pipe 30 respectively. Tuner 50 may be constructed as an unobstructed tubular fluid flow conduit in various forms, and has a given outside diameter less than that of the inside diameter of hose 36 so as to generally define concentrically therebetween an annular fluid-containing chamber 60 (see also FIGS. 3 and 4). As set forth in more detail hereinafter, chamber 60 in the construction of FIG. 2 is subdivided into two subchambers $60_1$ and $60_2$ by providing a restrictor subassembly 64 centered longitudinally in chamber 60 and along hose 36 and tuner 50, as shown schematically in FIG. 2.

Tuner 50 may take various forms as indicated by the first embodiment tuner 50 of FIGS. 3 and 4. In this embodiment, tuner 50 comprises a predetermined length of cylindrical tubing (made either of metallic, or, as shown, plastic material) having diametrically opposite pairs of radial passages or ports 68, 70, 72, 74, etc., evenly, or otherwise spaced axially therealong as shown in FIGS. 3 and 4 to provide fluid communication between the interior of tube 62 and the surrounding annular fluid-receiving chamber 60.

Alternatively, as shown in FIG. 5, the tuning cable comprises a commercially available form of flexible metal conduit 50' (similar to Romex or Bx electrical conduit material) which is radially relatively inflexible but is relatively flexible for simulated bending along its length by link-to-link pivoting to thereby accommodate curves in the power steering conduit system. Fluid leakage between the interior of tuner cable 50' and the surrounding fluid-receiving chamber space 60 is inherently provided by the loose overlap of each of the tubular link sections of the cable which radially lap loosely against one another.

The restrictors employed in attenuator conduit 28 also may take several forms. The first embodiment restrictor subassembly 64 shown in FIGS. 2 and 6 includes a "dog-bone" metal sleeve 76 having an initial sliding fit externally with tube 62 of tuner 50 and internally with hose 36. A malleable metal crimping collar 78 is sleeved over the outer diameter of hose 36 and registered axially with sleeve 76. Then collar 78 is suitably crimped to radially compress and cold work the center section thereof into the crimped joint shown in FIG. 6. Sleeve 76 of restrictor 64 then forms a wave-reflecting barrier disposed centrally of annular chamber 60 and thus defines the adjacent ends of first subchamber $60_1$ and second subchamber $60_2$. Sleeve 76 may be made as a fluid-tight barrier as shown, or alternatively as a throttling member with axial through-passage(s) in the manner of throttling member 13 of the Zimmermann et al U.S. Pat. No. 5,201,343, or in the manner of the throttle element 4 of the Buchholz et al U.S. Pat. No. 4,611,633, both referenced previously hereinabove.

The restrictor also may, as shown in FIG. 7, be constructed in the form of an annular small disk 80 that is welded, press fit or otherwise suitably externally attached to tuner tube 62 and inserted slidably inside hose 36. Disk 80 can be made of rubber, metal or plastic and can be made to serve as an imperforate reflective barrier covering the entire cross-sectional bore area of annular subchambers $60_1$ and $60_2$. Alternatively, disk 80 may be perforated, or have a clearance between its outside diameter and the inside diameter of hose 36, to thereby allow limited fluid flow from subchamber $60_1$ to subchamber $60_2$ through or past disk 80. The restrictor may also take the form shown in FIG. 8, i.e., a plastic sleeve 82 slid with a slight interference fit in the annular space between tuner tube 62 and hose 36 and suitably fixed to both members as by ultrasonic welding, adhesive bonding, plastic welding, etc.

Attenuator conduit 28 of the system of FIG. 2 thus provides a predetermined length of volumetrically compliant, radially extensible hose 36 provided with a coaxial interior tuning cable 50 that is at least axially coextensive with hose 36, and wherein restrictor 64 is positioned to divide the annular chamber 60 of attenuator conduit 28 into first and second subchambers $60_1$ and $60_2$ of approximately equal length axially of the conduit. Alternatively, the second subchamber $60_2$ may be a multiple of ⅓, ½, etc. of the fundamental wave length of interest, i.e., if subchamber $60_2$ has an axial length equal either to approximately ¼ or ⅓ of such wave length, subchamber $60_2$ may have an axial length respectively of either ½ or ⅔ of such wave length. Such subchambers can be considered to be defined by the inside diameter of hose 36 and, in the direction of fluid flow, can be considered to be a quarter-wave branch conduit component of a first or upstream tuning chamber designated $C_1$ in FIG. 2 and a second or downstream chamber designated $C_2$. In this embodiment, it thus will be seen that each of these chambers $C_1$ and $C_2$ contains a tuner cable comprising the portion of tube 62 extending therethrough, this tuning cable or tuner running at least from the beginning of each chamber $C_1$, $C_2$ to its end (or close to it).

In the embodiment of the attenuator conduit 28' shown in FIG. 9, the portion of tuner tube 62 extending between the upstream end of centrally-positioned restrictor 64 and the outlet end 38 of pipe 26 is removed from chamber $C_1$. Hence only the second chamber $C_2$ contains a tuner 50' that in turn extends at least the full length of chamber $C_2$.

In the third embodiment illustrated in FIG. 10, the attenuator conduit 28" is subdivided into three tuning chambers $C_1$, $C_2$ and $C_3$, all approximately equal in length. Again, alternatively, the second and third subchambers $C_2$ and $C_3$ may each have an axial length twice that of the first subchamber $C_1$. This is accomplished by providing two restrictors 64' and 64" constructed similar to restrictor 64 but located appropriately longitudinally of hose 36 as indicated in FIG. 10 to form the three chambers. Note that in attenuator conduit 28", a tuning cable or tube is removed only from the first or upstream chamber $C_1$, i.e., the chamber closest to the ripple source consisting of pump 22.

In a fourth embodiment, not shown, the same is constructed identically to attenuator conduit 28" except that tuner cable 50" also extends through the first chamber $C_1$ in the manner of the tuner cable in attenuator 28 of FIG. 2.

The aforementioned rigid wall conduit embodiment of the current invention is intended to replace the expensive elastomeric hose conduit 36 with a metallic pipe or tube exterior conduit with an insert or a tuner tube inside. This construction may appear in cross-section the same as that shown in FIG. 4, except for such change in materials. This is shown to provide similar attenuation characteristics to tuned compliant hoses at a lower cost. This embodiment also offers design flexibility to meet packaging constraints of certain vehicles. For example, a tuned rigid wall pipe attenuator conduct may be as short as 6 inches or shorter in overall length with an outside diameter as large as 9 inches, or it may come with 1 inch outside diameter and 24 inch length. Both of these systems offer attenuation similar to tuned compliant hoses which are usually long, and limited in diameter.

Thus, in the rigid wall outer conduit attenuator embodiment of the invention, the elastomeric hose 36 is replaced with metallic hose of similar or larger diameter (not shown). The tuner is constructed to permit the working fluid to leak radially from the tuner tube bore to the surrounding annulus chamber. The fluid remains static in that area in the annulus with slightly higher pressure than the mean pressure in the bore area. The fluid itself acts as a damper and thus will provide the necessary damping that otherwise would have to be provided by the hose. In the case of a volumetric compliant tuner tube, this fluid annulus will provide a reasonable bulk modulus value for the tuner to expand (and contract) when a pulse is passing by, thereby providing more volume. This in turn will reduce the pulse magnitude, i.e., attenuate it.

In addition to the above mechanism, the fluid filled rigid wall pipe also provides higher mass in the fluid system when compared with simple tuned hoses. The additional mass will help impede the acceleration for similar pressure values. This in turn will help minimize the resulting vibration from the system.

The rigid wall pipe embodiment of attenuator conduit of the invention is designed to use inexpensive materials like metallic tubes instead of expensive elastomeric reinforced hoses. Such inexpensive material utilizes an insert or a tuner tube to go along most (or all) of the length of the main pipe or tube. The damping usually provided by the elastomeric outer hoses is provided in this embodiment by the fluid retained between the tuner and the rigid wall outer pipe. To attenuate the fluid ripple even further, this embodiment, like the previous embodiments, preferably again divides the fluid line(s) into "chambers" in the same manner.

The method of the current invention will also provide the optimum attenuation capacity of the rigid wall pipe and tuner embodiment construction. Again, the length of each chamber and the number of chambers used will depend on the pressure ripple source; the total hydraulic system and the vehicle structure at hand.

The restrictor in the rigid wall pipe embodiment may comprise the annular small disk 80 that is welded, press fit or attached to the tuner tube and inserted inside the fluid line pipe. This disk can be made of rubber, metal or plastic. The disk can cover the entire annulus bore area of the fluid line. The disk may also be constructed to allow a limited flow to move to the next chamber in the annulus. The obstruction can also be made of short tubes of varying diameters that are concentrically superimposed on top of each other between the tuner and the external tube.

It will now be better understood from the foregoing embodiment iterations that the invention is designed in accordance with predetermined system parameters to divide the fluid attenuator conduit of the system into "tuning chambers". The chambers are approximately equal in length or multiples of first chamber length, which in turn is related to a selected wave length. Each chamber may contain a flow conduit tuner that runs from the beginning of the chamber to its end. The length of each chamber depends on the wave source, the vehicle itself and the complete hydraulic system. Dividing the system into chambers helps attenuate particular frequencies and their harmonics very effectively. By selecting a suitable chamber length, the fundamental frequency can be attenuated in each chamber. Higher orders of the frequency are attenuated in a multiple of chambers. For example, the second harmonic is attenuated in two consecutive chambers. Thus, a two-chamber system (FIGS. 2 and 9) will provide a total of two attenuators for the fundamental frequency and one attenuator for its second harmonic. A three-chamber system (FIG. 10) will provide three attenuators for the fundamental frequency, two for its second harmonic, one for its third harmonic, and so on. This attenuator conduit mechanism thus will be designed to provide an optimum wave cancellation device in the hydraulic circuit.

In order to provide the most effective damping, the tuner is allowed to extend to the end of each chamber (or close to that point). The holes 68–74 in the tuner surface and its flexibility will allow the fluid to leak through the holes of the tuner to the chamber annulus 60. The fluid in each annulus subchamber $60_1$ and $60_2$ is virtually static (i.e., not moving) because of the obstructions 84 and 42 at the respective downstream ends of such subchambers in the annulus. Simple principles of fluid dynamics show that the fluid in the annulus 60 will be under higher pressure and much lower velocity than that in the bore of the tuner conduit 50. This dynamic condition will retain the pressurized fluid in the annulus 60.

The retained fluid itself can act as a damper similar to the lining of the hose 36, provided that the tuner is flexible, i.e., radially expansible and contractible. This will effectively be equivalent to choosing a hose with a smaller bore radius and, therefore, with more damping capability. The fact that the bulk modulus of the fluid is close to that of the hose lining will enhance the performance of the fluid as a damper.

The radial flexibility of the tuner will allow it to readily expand as the pressure waves passes through, giving it more volume and reducing the top of traveling pressure wave. This will reduce the pressure ripple. On the other hand, if the bottom of the wave passes by the radially flexible tuner will radially contract, giving the flow fluid less volume. This increases its pressure to become close the mean value.

From the foregoing, it will now be understood that the present invention enables the optimum attenuation capacity to be achieved in the hose and tuner construction. The length of each chamber and the number of chambers used will depend on the pressure ripple sources, the total hydraulic system and the vehicle structure at hand.

The invention also enables the ripple at the source to be further reduced by removing the tuner from the first chamber $C_2$ (the closest chamber to the ripple source in FIGS. 9 and 10). The attenuation mechanism employed in this upstream tuner-less chamber is simply wave cancellation. Removing the tuner allows the fluid to flow through the entire cross-sectional area circumscribed by the hose bore I.D., and for the pressure wave to likewise be propagated in this open chamber and then be reflected back from the obstruction point (e.g. restrictor 64). This allows two traveling waves to meet at one point, with one at a 180 degree phase shaft, thereby causing the total ripple at the source to add to approximately zero for the particular frequency range accommodated by the design parameters selected.

In actual practice, tuner 50 can be made from a single length of tubing 60 that can be utilized for the entire hose assembly 28, 28' or 28" by strategic clamping methods to also thereby form the multiple chambers. As another alternative approach, a plurality of discrete tuning cables, one in each chamber, can be used. In both cases, the attenuation capacity of the system is substantially similar.

A bench test rig with the components constructed as described in FIG. 1 was built to test the invention and compare it with the current practice. Several embodiments of attenuator conduit hose systems were tested. These attenuator hose systems consisted of two and three chambers. The tuner of the first or upstream chamber $C_1$ was removed in many of these systems (a la FIGS. 9 and 10) to find the effectiveness of this modification in attenuating the ripple at the pump. The following conclusions were derived from the results of such testing:

1. Two chambers $C_1$ and $C_2$ with one tuner 50' only in the downstream gear-end chamber $C_2$ is found effective in attenuating ripple at the pump 22. Shorter lengths of the two chambers $C_1$ and $C_2$ are effective in attenuating higher frequencies, and longer ones are more effective in attenuating lower frequencies. Adding a tuner to the pump-end chamber $C_1$ (as in FIG. 2) will help attenuate ripple at gear 32. The software described earlier can be used to optimize the length of each chamber such that best performance is obtained.
2. Three chambers $C_1$, $C_2$ and $C_3$ are found extremely effective in attenuating the ripple at gear 32. Considerable reduction of pump ripple can be obtained by removing the tuner from the pump end chamber (as in FIG. 10). The foregoing software should be used to optimize lengths of the three chambers, such that both pump and gear ripples are minimized.
3. Shorter lengths of three chambers $C_1$, $C_2$ and $C_3$ are found effective in attenuating high frequencies, and longer ones are found more effective in attenuating low frequencies.

By way of working example, the following procedural steps may be employed, using the aforementioned software, to thereby optimize for the lengths of the chambers in a vehicle power steering system in accordance with the invention:

1. Take measurements of:
   a. Sound inside the vehicle
   b. Pressure and accelerometer readings near the pump, and
   c. Pressure and accelerometer readings near the steering gear inlet.
2. From the measurement of sound, find the frequencies that cause the undesirable sound.
3. From the measurements of the accelerometers and pressure transducers, find which location contributes more to the pressure levels inside the vehicle.
4. If the pump transducers are showing high amplitudes and correlating with sound levels inside the vehicle, then run the software four times, with the first chamber empty:
   a. Two chambered hose with the first chamber empty and the other chamber tuned;
   b. Three chambered hose with the first chamber empty and the other two chambers tuned;
   c. Two chambered pipe with the first chamber empty and the other chamber tuned; and
   d. Three chambered pipe with the first chamber empty and the other two chambers tuned.
5. The software will give four optimal solutions. Each corresponds to those described in step four and shows the exact length of each chamber and tuner inside, the exact diameter of pipe and hose needed to achieve the best solution (that is minimizing the frequencies recorded in step 1).
6. Determine which of the four solutions should be pursued based on packaging and cost
7. If the steering gear ripple is high in magnitude and correlates more with interior sound, perform steps 4 through 6 keeping all tuners in all chambers.

For further background information helpful in constructing the aforementioned software by one of ordinary skill in the art, reference may be made to a doctoral dissertation incorporated herein by reference and entitled "THE USE OF FLEXIBLE HOSE TO REDUCE PRESSURE RIPPLE IN POWER STEERING", submitted by Dr. J. E. Drew for the degree of PhD of the University of Bath in 1997.

As summarized by the author: "This study considers the use of flexible hose, with or without inserts, to attenuate harmonic pressure pulsations within a power steering system . . . A detailed theoretical model of the longitudinal vibration transmission characteristics of a fluid filled hose assembly, both with and without inserts, has been developed. The transmission characteristics are presented in the frequency domain in the form of a 4×4 impedance matrix, relating the pressure and wall force at each hose end to the flow and wall velocity. This allows the structural and fluid transmission from the hose assembly to the subsequent pipework to be examined. An experimental method has been developed for measuring this matrix under realistic conditions. Measurements taken provide a means of obtaining the dynamic properties of hose walls which are necessary for the theoretical analysis. Both theory and measurements have been used to investigate the important physical characteristics of the hose assembly.

A complete power steering system model has been developed from individual component models, consisting of either a mathematical analysis or measured harmonic data. Providing the pressure and flow ripple at any component link, the system model will help in the design of low noise systems and enable the fluid-borne noise in the power steering system to be evaluated at the design stage in an efficient manner."

What is claimed is:

1. An apparatus for reduction of fluid borne noise in a hydraulic system, said apparatus comprising:
   a first and a second conduit member operably coupled to one another for conducting the system fluid serially therethrough from said first to said second conduit member, each of said first and second conduit members having a wall defining a passage having a predetermined diameter, said wall being formed either of a compliant material permitting volumetrical expansion of said passage in response to an increase in system fluid pressure therein or of a rigid non-compliant material preventing such volumetric expansion;
   an elongated radially perforated tuner flow member disposed internally in at least one of said members and having a bore and a pair of ends, one of said pair of ends being connected to one end of said first conduit member and a downstream other end of said pair of ends of said flow member being connected to an end of said second conduit member most remote from said first conduit member, said bore having an outside diameter smaller than said predetermined diameter of said passage to define an annular space therebetween and consequently having an even smaller inside diameter that thereby restricts flow of said fluid from said first conduit to said second conduit;
   an input member operably connected in upstream relation to said first conduit member to permit introduction of fluid into said passage; and
   an output member operably connected in downstream relation to said second conduit to permit delivery of fluid to said hydraulic system.

2. The apparatus of claim 1 wherein each of said first and second conduit members are integrally united with one another and thereby comprise either a single volumetrically compliant hose section or a single length of rigid wall pipe.

3. The apparatus of claim 1 wherein said one end of said first conduit member constitutes the end thereof most remote from said second conduit member such that said tuner flow member extends axially throughout the axial extent of said passage and said first and second conduit members.

4. The apparatus of claim 1 wherein said one end of said flow member pair of ends is connected to said one end of said first conduit member by restrictor means disposed between said flow member and said conduit member in said passage to thereby restrict flow of fluid from the first conduit to the second conduit externally of the tuner flow member.

5. The apparatus of claim 4 further including a third conduit member operably coupled to said second conduit member for conducting the system fluid serially therethrough from said second to said third conduit members, said third conduit member also having a wall defining a passage having said predetermined diameter and being formed either of a compliant material permitting volumetrical expansion of the passage in response to an increase in system fluid pressure therein or of a rigid non-compliant material preventing such expansion, second restrictor means disposed in said passage intermediate said second and third conduit members in said passage and operable to restrict flow of fluid from said second conduit to said third conduit, said flow member also being disposed internally of said third conduit member.

6. The apparatus of claim 5 wherein said one end of said first conduit member constitutes the upstream end thereof such that said perforate flow member is disposed internally in all three of said first, second and third conduit members.

7. The apparatus of claim 5 wherein said one end of said first conduit member constitutes the downstream end thereof whereby said passage defined in said first conduit member is devoid of said perforate flow member.

8. The apparatus of claim 1 wherein said first and second conduit members are generally of equal length, or said second member has an axial length generally twice that of said first member, and wherein the overall axial length of said members is generally equal to the wave length of a fundamental frequency or frequencies in a narrow band that represents the most objectionable noise generating frequency as a function of the wave source in the hydraulic system and of the complete hydraulic system as well as the environmental apparatus in which the system is contained and operable.

9. An expansion hose construction for reducing pressure pulsations in a hydraulic circuit, said expansion hose construction comprising:
   an outer hose having a first hose chamber on an inlet side with an inlet end adapted to receive the pressure pulsations from the hydraulic circuit and a second hose chamber on an outlet side with an outlet end;
   a throttle element between the first and second chambers; and
   an inner hose connected to one end of the outer hose inlet end and having a portion extending through the first hose chamber and the throttle element and a portion extending through the second chamber, the portions of the inner hose within the first and second hose chambers each having at least one radial throttle passage.

10. A fluid pressure wave motion attenuating device for transmitting a fluid under pressure between a pair of oppositely disposed fluid ducts comprising:
   a pair of couplings,
   a fluid conduit adapted to be fixed at its opposite end portions to said ducts through said pair of couplings with each of said couplings fixed to one of said end portions of said fluid conduit by means of a crimp hose-fitting, a flexible inner tube coaxially mounted in said fluid conduit and sized relative thereto to form a main conduit internally of said inner tube and to form an annular space between said fluid conduit and said inner tube, said inner tube being fixed at its opposite end portions to said pair of couplings, a restrictor in said annular space subdividing the same longitudinally into annular sub-spaces, and aperture means through said flexible inner tube each providing fluid communication between said main conduit and said annular sub-spaces between said fluid conduit and said inner tube on each side of said restrictor, whereby each of said annular sub-spaces serves as a fluid pulsation-absorption side-branch of said device.

11. An improved apparatus for reduction of fluid borne noise in a hydraulic system, said apparatus forming a passage and comprising:

a first, a second and a third conduit member, said first, second and third conduit members having circumferential walls of predetermined internal bore diameters, said walls being formed of either a compliant material permitting volumetrical expansion of portions of said passage comprised therein in response to an increase in system fluid pressure therein or of a non-compliant material preventing such expansion;

first and second radially perforate tuner flow members disposed internally respectively in said second and third conduit members and each having a bore and a pair of ends, one of said pair of ends of said first flow member being connected to a downstream end of said first conduit member and another end of said first flow member being connected to an upstream end of said third conduit member, one of said pair of ends of said second flow member being connected to a downstream end of said second conduit member and another end of said second flow member being connected to a downstream end of said third conduit member, said flow members having outside diameters smaller than said predetermined bore diameters of said first, second and third conduit members to define annular chambers respectively therebetween and to restrict flow of said fluid from said first conduit member to said second conduit member and from said second conduit member to said first conduit member, said flow members being perforate to allow fluid flow radially therefrom into surrounding space of said annular chambers defined between said conduit and flow members;

first and second flow restrictor means disposed in said passage radially between said flow member and said conduit members and axially respectively at the downstream ends of said first and second conduit members;

an input member connected to an upstream end of said first conduit member to permit introduction of a flow of fluid into said passage; and an output member connected to a downstream end of said third conduit member to permit delivery of said flow of fluid from said second tuner flow member to remaining portions of said hydraulic system.

12. A method for reducing fluid and structure borne noise signal components in a hydraulic system, said method comprising the steps of:

hydraulically coupling an output port of a pump to a fluid conduit member to admit thereto a majority of alternating fluid flow components of a hydraulic signal issuing therefrom, said member being operable as a broadband filter for dampening by absorption a majority of the signal components; and subdividing said member by design and construction of tuning chambers in said member in a predetermined manner such that the flow of fluid from said pump within said member substantially attenuates at least the first and second harmonic components of a pre-selected narrow band of frequencies of the alternating fluid flow components of said signal.

13. In a method for reducing fluid borne noise signal components in hydraulic systems that includes the known steps of passing a flow of fluid through a first fluid conduit member to bypass alternating fluid flow components of a hydraulic signal, passing fluid from said first conduit member through a flow barrier via a reduced diameter flow member to impede further transmission of remaining alternating fluid flow components beyond said first conduit member, and passing said fluid flow from said flow member into a second fluid conduit member to remove further remaining alternating fluid flow components, the improvement comprising the further steps of:

hydraulically coupling an output port of a pump to said first fluid conduit member to admit thereto a majority of alternating fluid flow components of a hydraulic signal issuing therefrom, said first member being constructed and arranged to be operable as a broadband filter for dampening by absorption a majority of the signal components; and subdividing such members by design and construction of tuning flow member means in said fluid conduit members in a predetermined manner such that the flow of fluid from said pump within said fluid conduit members substantially attenuates at least the first and second harmonic components of a pre-selected narrow band of frequencies of the alternating fluid flow components of said signal.

\* \* \* \* \*